(12) United States Patent
Gehlhoff

(10) Patent No.: US 7,124,579 B1
(45) Date of Patent: Oct. 24, 2006

(54) ANTI JERK VALVE

(75) Inventor: Wade L. Gehlhoff, Shakopee, MN (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 11/124,933

(22) Filed: May 9, 2005

(51) Int. Cl.
*F16D 31/02* (2006.01)

(52) U.S. Cl. .......................................... 60/469; 60/468

(58) Field of Classification Search ................ 60/422, 60/452, 468, 469; 91/516; 137/115.13; 251/63, 63.5
See application file for complete search history.

(56) References Cited

U.S. PATENT DOCUMENTS

| | | | |
|---|---|---|---|
| 3,330,298 A | | 7/1967 | Allen |
| 4,040,439 A | | 8/1977 | Uppal |
| 4,838,314 A | * | 6/1989 | Gage ........................... 60/468 |
| 5,048,296 A | * | 9/1991 | Sunamura et al. ............. 60/469 |
| 5,050,696 A | * | 9/1991 | McGovern et al. .......... 180/406 |
| 6,176,083 B1 | * | 1/2001 | Ikari ............................ 60/452 |
| 6,474,064 B1 | * | 11/2002 | Heyne et al. .................. 60/469 |

* cited by examiner

*Primary Examiner*—Edward K. Look
*Assistant Examiner*—Michael Leslie
(74) *Attorney, Agent, or Firm*—Jarett D. Millar; L. J. Kasper

(57) ABSTRACT

A hydraulic control system including a source (11) of fluid having a pressure responsive means (15) and an actuator. A main control valve (21) has ports (27,29) communicating with the actuator ports by means of first (41) and second (43) conduits, and means to generate a load pressure (45). A pressure spike suppression valve (51) has ports connected across the conduits, the valve including a spool (65) moveable between a first position blocking communication between the ports, and a second position permitting communication. The valve (51) defines a spring chamber (67) including a spring (69) biasing the spool toward the first position. The valve defines a load signal passage (83) to communicate the load pressure to a chamber also to bias the spool toward the first position. The valve defines a pressure chamber (81) in communication with the source, fluid pressure therein biasing the spool toward the second position.

5 Claims, 3 Drawing Sheets

ANTI JERK VALVE

BACKGROUND OF THE DISCLOSURE

The present invention relates to hydraulic control systems, and more particularly, to those control systems of the "load sensing" type, i.e., a hydraulic control system in which a load signal is generated which is representative of the hydraulic load on the circuit, with that load signal being utilized to control, or at least vary, the rate of fluid delivery of the source of pressurized fluid for the circuit.

Although the present invention may be utilized with hydraulic control circuits for a number of different applications, whether on a mobile vehicle, or on a stationary (or industrial) hydraulic system, the invention is especially advantageous when used in conjunction with a hydrostatic power steering system for a mobile vehicle, and will be described in connection therewith. Furthermore, the present invention is of special benefit when used as part of a hydrostatic power steering system to steer a vehicle, such as an articulated vehicle, in which the load on the steering actuator is quite substantial, or the steering "inertia" of the vehicle is very large.

A hydrostatic power steering system of the type which would utilize the present invention would typically include a pump (fixed or variable), a load sensing priority flow control valve ("LSPV") which apportions flow between a priority load circuit (in this case, the steering circuit) and an auxiliary load circuit (another vehicle hydraulic function) in response to variations in a load signal representative of the hydraulic load on the priority load circuit. Flow from the LSPV to the steering actuator (typically, one or more steering cylinders) is controlled by a steering valve such as the Orbitrol® steering control unit (SCU) sold commercially by the assignee of the present invention.

As is now well known to those skilled in the art, a conventional SCU, of the type used in a load sensing circuit, defines various flow control orifices which are closed when the SCU is in its neutral condition (no steering input) and the various flow control orifices begin to open as the operator rotates the steering wheel in either direction from the neutral condition, to select either a right turn or a left turn.

It has been observed that on vehicles such as large, articulated vehicles, if the vehicle operator suddenly stops the steering input to the SCU, or suddenly reverses steering direction, one result which is likely to occur is a substantial pressure spike in the conduits interconnecting the SCU and the steering actuator, which is likely to impose a severe "jerking" movement to the vehicle. These pressure spikes, which need to be relieved, are caused in part by the momentum of the steering actuator, and the fluid in the lines between the actuator and the SCU being trapped, because of the SCU control orifices closing. The resulting jerking movement can be extremely undesirable from the viewpoint of operator safety and comfort.

For years, those skilled in the hydraulics art have utilized valves of the type commonly referred to as "cushion valves" to deal with the problem of pressure spikes in hydraulic lines, especially in lines between a control valve and an actuator. Examples of such cushion valve arrangements are shown in U.S. Pat. Nos. 3,330,298 and 4,040,439, both of which are assigned to the assignee of the present invention and incorporated herein by reference. Although such cushion valve arrangements have been used successfully in various applications, such valves typically operate on the "pressure rise rate" principle, as is well known to those skilled in the cushion valve art, thus limiting their usefulness in hydraulic systems (and particularly in steering systems) subjected to the "sudden stop" or "sudden reversal" types of condition described above. Another deficiency of cushion valves is that during every steering motion flow from the SCU work ports is used to shift a valve spool of significant size, thus resulting in some lost motion. Such lost motion can lead to control difficulties at higher vehicle speeds. Furthermore, the typical cushion valve arrangement known in the prior art has been very complex and expensive, thus further limiting the commercial potential of such valves.

BRIEF SUMMARY OF THE INVENTION

Accordingly, it is an object of the present invention to provide an improved hydraulic control system of the type described including a pressure spike suppression valve which enables the hydraulic control system to overcome the above-described disadvantages of the prior art.

More specifically, it is an object of the present invention to provide such an improved hydraulic control system in which the pressure spike suppression valve does not operate in response to the pressure differential, or the rate of rise of the pressure differential, between the two conduits communicating fluid to and from the pressure-operated actuator.

It is a related object of the present invention to provide such an improved hydraulic control system, and a pressure spike suppression valve for use therein, which is able to respond very quickly to conditions elsewhere in the circuit which would otherwise result in a pressure spike in one of the conduits communicating with the actuator, whereby such conditions serve as a "leading" indicator of an impending pressure spike or surge.

The above and other objects of the invention are accomplished by the provision of an improved hydraulic control system including a source of pressurized fluid having a load pressure responsive means for varying the fluid delivery of the source. A fluid pressure operated actuator defines a pair of actuator ports. A main control valve has an inlet in fluid communication with the source and a pair of control ports in fluid communication with the actuator ports by means of first and second conduits. The main control valve defines a main variable flow control orifice which is closed to prevent fluid flow through the main control valve when the main control valve is in a neutral condition. The main control valve includes means operable to generate a load pressure representative of the hydraulic load on the actuator. A pressure spike suppression valve has first and second ports connected to the first and second conduits, respectively, the pressure spike suppression valve including a valve member moveable between a first position blocking fluid communication between the first and second ports, and a second position permitting fluid communication between the first and second ports.

The improved hydraulic control system is characterized by the pressure spike suppression valve defining a spring chamber including a compression spring biasing the valve member toward the first position. The pressure spike suppression valve defines a load signal passage to communicate the load pressure to a load signal chamber also to bias the valve member toward the first position. The pressure spike suppression valve defines a pressure chamber in fluid communication with the source of pressurized fluid, and fluid pressure in the pressure chamber biases the valve member toward the second position.

DETAILED DESCRIPTION OF THE PREFERRED EMBODIMENT

Figure 1:
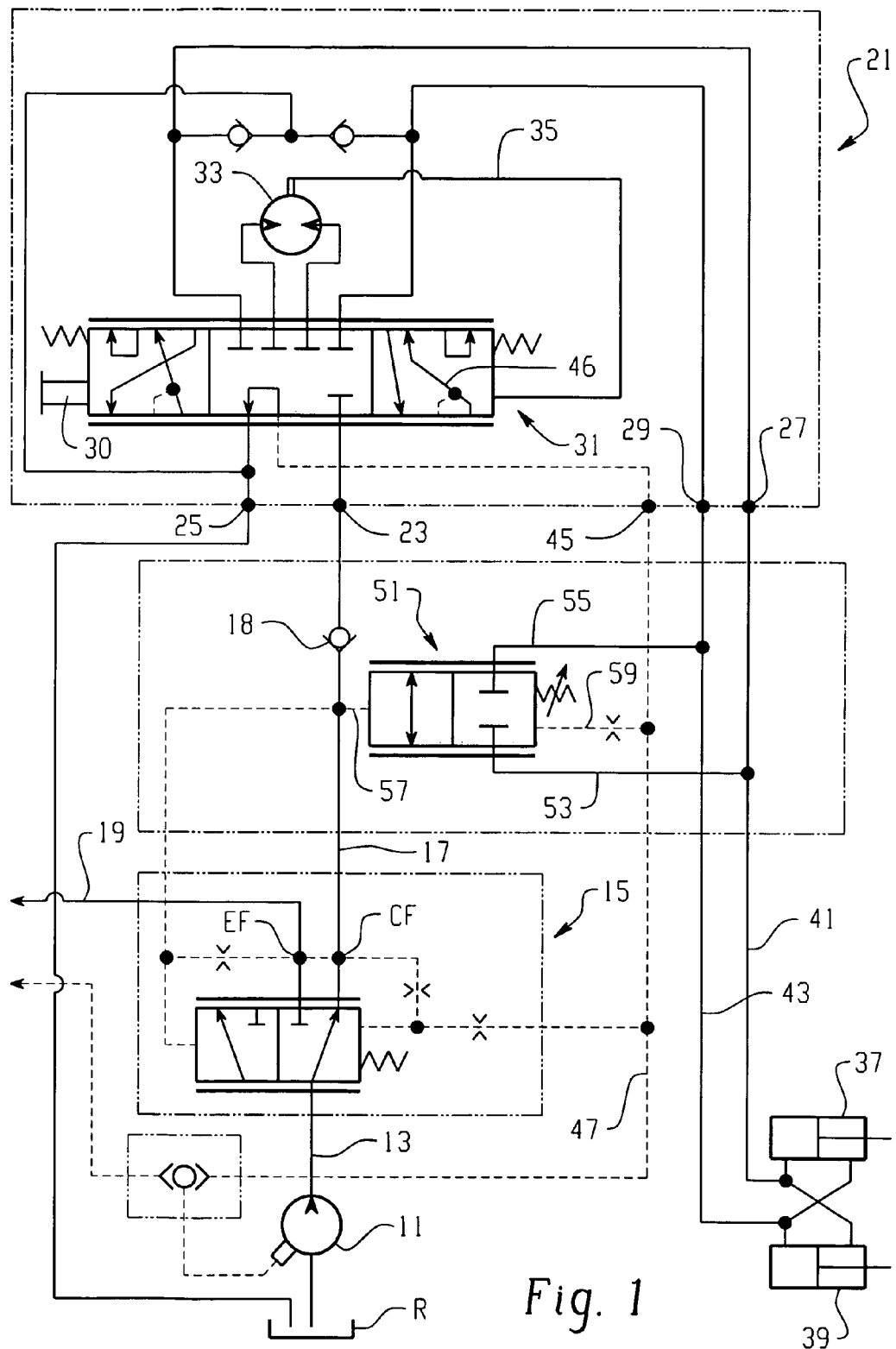
FIG. 1 is a hydraulic schematic of a hydrostatic power steering system, including the present invention.

Referring now to the drawings, which are not intended to limit the invention, FIG. 1 is a hydraulic schematic of a hydraulic control system for a mobile vehicle, including a hydrostatic ("full fluid-linked") power steering system of the type which can advantageously utilize the present invention, and which is illustrated schematically as including the present invention. The system includes a fluid pump 11 which has its inlet connected to a system reservoir R. The outlet of the pump 11 is in fluid communication by means of a conduit 13 with the inlet of a load sensing priority flow control valve (LSPV), generally designated 15, of the type illustrated and described in U.S. Pat. No. 3,455,210, assigned to the assignee of the present invention and incorporated herein by reference. As is well known to those skilled in the art, the LSPV includes a controlled flow outlet port ("CF") which communicates by means of a conduit 17, through a check valve 18, to a priority load circuit, and an excess flow outlet port ("EF") in fluid communication by means of a conduit 19 to some sort of auxiliary hydraulic load circuit (not shown herein).

In the subject embodiment, and by way of example only, the priority load circuit to which the conduit 17 is connected is a steering control unit (SCU), generally designated 21, which includes an inlet port 23, a return port 25, and a pair of control fluid ports 27 and 29. As is generally well known to those skilled in the power steering art, the SCU 21 includes controller valving, generally designated 31, by means of which the flow of pressurized fluid from the inlet port 23 may be communicated to either of the control ports 27 or 29, depending upon the direction of steering input (represented schematically at "30") to the controller valving 31. Typically, the SCU 21 includes a fluid meter 33, by means of which the fluid flowing through the controller valving 31 is measured (or "metered"). In addition, the fluid meter 33 provides, by means of a mechanical follow-up element 35, the appropriate follow-up movement to the controller valving 31 to return the valving 31 to its neutral condition when the steering input 30 to the SCU 21 ceases. It should be clear from the earlier description that the present invention is not limited to use in a hydraulic circuit in which the priority load circuit is hydrostatic power steering.

Referring still primarily to FIG. 1, the hydrostatic power steering system shown therein includes a pair of steering cylinders 37 and 39, each of which has a chamber in fluid communication with the control port 27 by means of a fluid conduit 41, and each of which has an opposite fluid chamber in fluid communication with the control port 29 by means of a fluid conduit 43. Those skilled in the art will understand that the present invention is not limited to any particular arrangement of cylinders 37 and 39, nor is the invention limited to a system having more than one cylinder, nor does the present invention require that the fluid pressure operated actuator be a cylinder at all, but instead, could comprise any form of hydraulic actuator or motor. Referring still to FIG. 1, in accordance with one important aspect of the present invention, the SCU 21 is of the type which generates a load pressure representative of the hydraulic load on the actuator (steering cylinders 37 and 39). Therefore, the SCU 21 includes a load signal port 45 which receives a load signal from a location disposed downstream of a main variable flow control orifice (the schematic location of which is referenced at "46" in FIG. 1) defined by the controller valving 31 in a manner well known to those skilled in the art. The load signal is communicated from the load signal port 45 through a load signal line 47 to the LSPV 15, biasing the LSPV toward a position of greater flow in the conduit 17 and less flow in the conduit 19, all of which is also well known in the art.

Referring still primarily to FIG. 1, it may be seen that there is included, in the hydraulic control system, a pressure spike suppression valve, generally designated 51. The valve 51 is in fluid communication with the fluid conduit 41 by means of a conduit 53, and is in fluid communication with the fluid conduit 43 by means of a conduit 55, such that the pressure spike suppression valve 51 is in a position to effectively "cross-port" the fluid conduits 41 and 43. In addition, the valve 51 is in communication with the main system pressure conduit 17, communicating system pressure, by means of a system pressure signal line 57, and finally, is in fluid communication with the load signal line 47 by means of a signal line 59.

Figure 2:
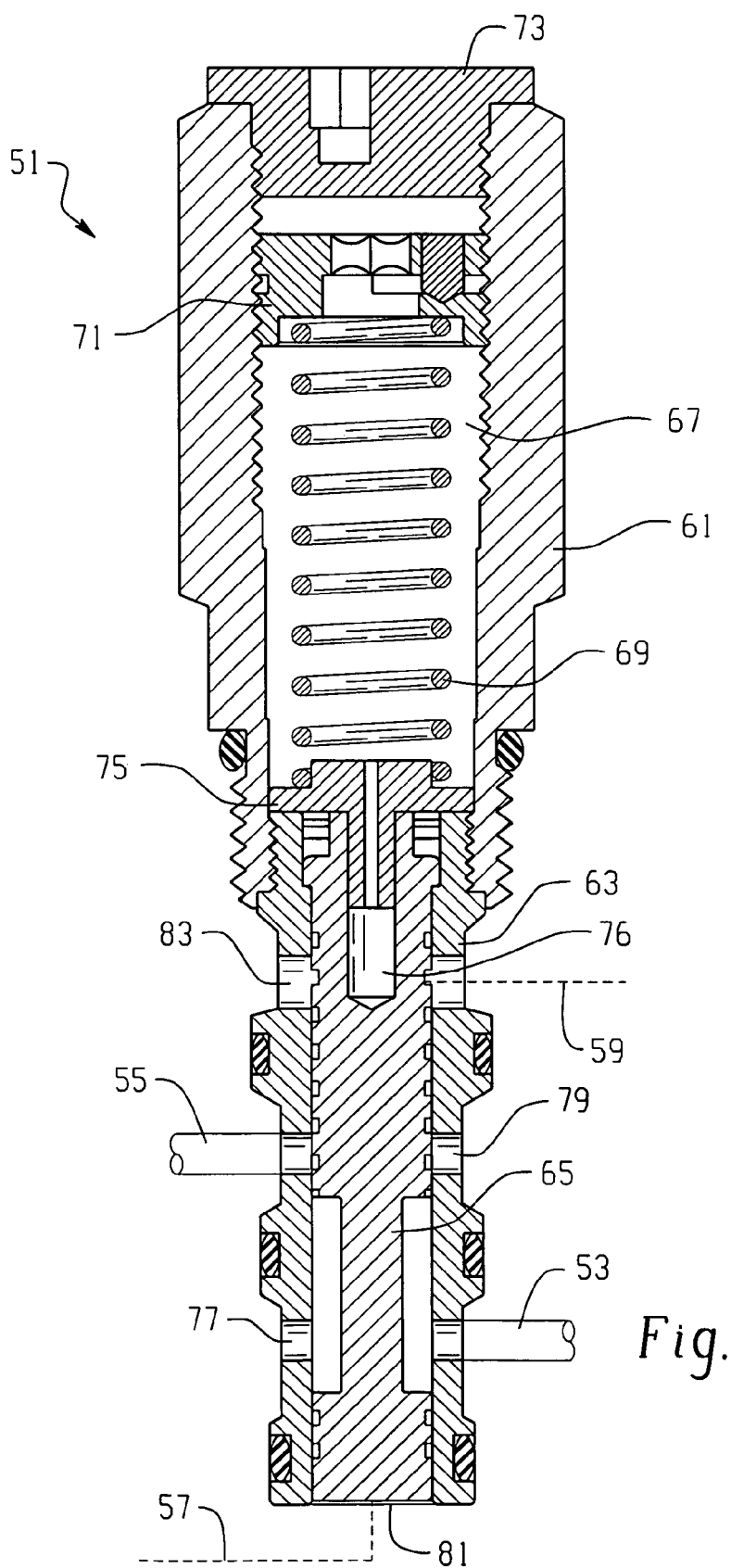
FIG. 2 is an axial cross-section of the pressure spike suppression valve, shown schematically in FIG. 1, which comprises one important aspect of the present invention.

Referring now primarily to FIG. 2, but in conjunction with FIG. 1, there is illustrated an axial cross-section of one embodiment of the pressure spike suppression valve 51 which comprises one aspect of the present invention. The valve 51 includes a main body which is externally threaded at its "lower" end in FIG. 2, such that the valve 51 may be threadedly engaged within a bore defined by a manifold or some other structure or portion of the circuit. In other words, the valve 51, in one preferred embodiment, is a cartridge valve, as that term is well understood in the valve art. In threaded engagement with an inner portion of the main body 61 is sleeve valve 63, and slidably disposed therein is a spool valve 65.

The main body 61 defines a spring chamber 67 and disposed therein is a compression spring 69. The main body 61 is internally threaded, and in threaded engagement therewith is an adjustable spring seat 71 which would typically be adjusted at the time of the assembly of the valve 51, or perhaps, would be finally adjusted upon final assembly and testing of the vehicle. In either case, the upper end in FIG. 2 of the main body 61 would have a threaded cap 73 in threaded engagement with the main body 61, thereby preventing any subsequent movement of the spring seat 71.

At the lower end (as viewed in FIG. 2) of the compression spring 69 is a spring seat member 75 which includes a portion telescoped within a central opening 76 in the spool valve 65, such that any movement of the spool valve 65 in an upward direction in FIG. 2 from the position shown can occur only in opposition to the biasing force of the spring 69.

Referring still to FIG. 2, the sleeve valve 63 defines one or more (preferably, several) radial ports 77 which are in communication with the conduit 53 (and the fluid conduit 41), and several radial ports 79 which are in fluid communication with the conduit 55 (and the fluid conduit 43). The lower end of the spool valve 65 defines a face (also referred to hereinafter and in the appended claims as a "chamber") 81 which is in communication with the system pressure signal line 57. Finally, the sleeve valve 63 defines several radial ports 83 which are in fluid communication with the signal line 59, connected to the load signal line 47. It should be noted in FIG. 2 that the spool valve 65 and the spring seat member 75 define additional fluid passages (including the central opening 76) whereby the radial ports 83 are able to communicate the load signal through the spring seat member 75 and into the spring chamber 67. For purposes of the appended claims, the spring chamber 67 also serves as a "load signal chamber", but it should be understood that the present invention is not limited to the chamber 67 being both the spring chamber and the load signal chamber, although such an arrangement may be more simple and compact, as shown herein in FIG. 2.

Therefore, the net force biasing the spool valve 65 to its "first" condition (as shown in FIG. 2) is the sum of the force of the compression spring 69 and the load signal pressure communicated by means of the signal line 59. In opposition, and tending to bias the spool valve 65 in an upward direction, toward a "second" position is the system pressure as communicated from the conduit 17 by means of the system pressure signal line 57. It should be noted that in the first position of the spool valve 65 shown in FIG. 2, the spool valve 65 blocks fluid communication between the radial ports 77 and the radial ports 79, thus blocking communication between the conduits 53 and 55, and therefore, also preventing any fluid communication between the fluid conduits 41 and 43.

As is well known to those skilled in the art, in a typical hydraulic control circuit of the type shown in FIG. 1, there is a "normal" pressure differential between the system pressure in the conduit 17 and the load pressure present in the load signal line 47. The compression spring 69 is selected such that the force exerted thereby on the spool valve 65 is substantially equivalent to the force which would be exerted on the spool valve 65 if the spool valve 65 were subjected to the "normal" pressure differential between system pressure and the load signal. Therefore, as long as the system is operating in its normal condition maintaining the designed pressure differential between system pressure and the load signal, the pressure spike suppression valve 51 will remain in the first position shown in FIG. 2, blocking any fluid communication between the fluid conduits 41 and 43.

However, if the SCU 21 is suddenly stopped or reversed, closing all of the various flow control orifices in the controller valving 31, including the main orifice 46, the system pressure in the conduit 17 will be trapped and will continue to rise, but the load signal present in the load signal line 47 will be drained to the system reservoir R by the SCU 21, in a manner which is now well known to those skilled in the art, thus quickly increasing the pressure differential between conduit 17 and load signal line 47.

Referring again to FIG. 2, this increasing pressure differential biases the spool valve 65 upward toward the "second" position (actually, a range of positions), permitting fluid communication from the conduit 53 to the conduit 55 (or vice versa). This permitted communication between the conduits 53 and 55, and therefore, between the fluid conduits 41 and 43, will prevent the build up of a pressure spike in whichever of the fluid conduits 41 or 43 in which it would have been likely to occur. However, in accordance with an important aspect of the present invention, the permitted communication occurs not by sensing and reacting to a difference between the pressures in the fluid conduits 41 and 43 or a particular rate of rise of pressure in either one of the conduits 41 or 43. Instead, the opening of communication between the fluid conduits 41 and 43 by the valve 51 occurs in response to the increasing pressure differential between system pressure and the load signal, which may be viewed as a "leading" indicator of an impending or imminent pressure spike.

Figure 3:
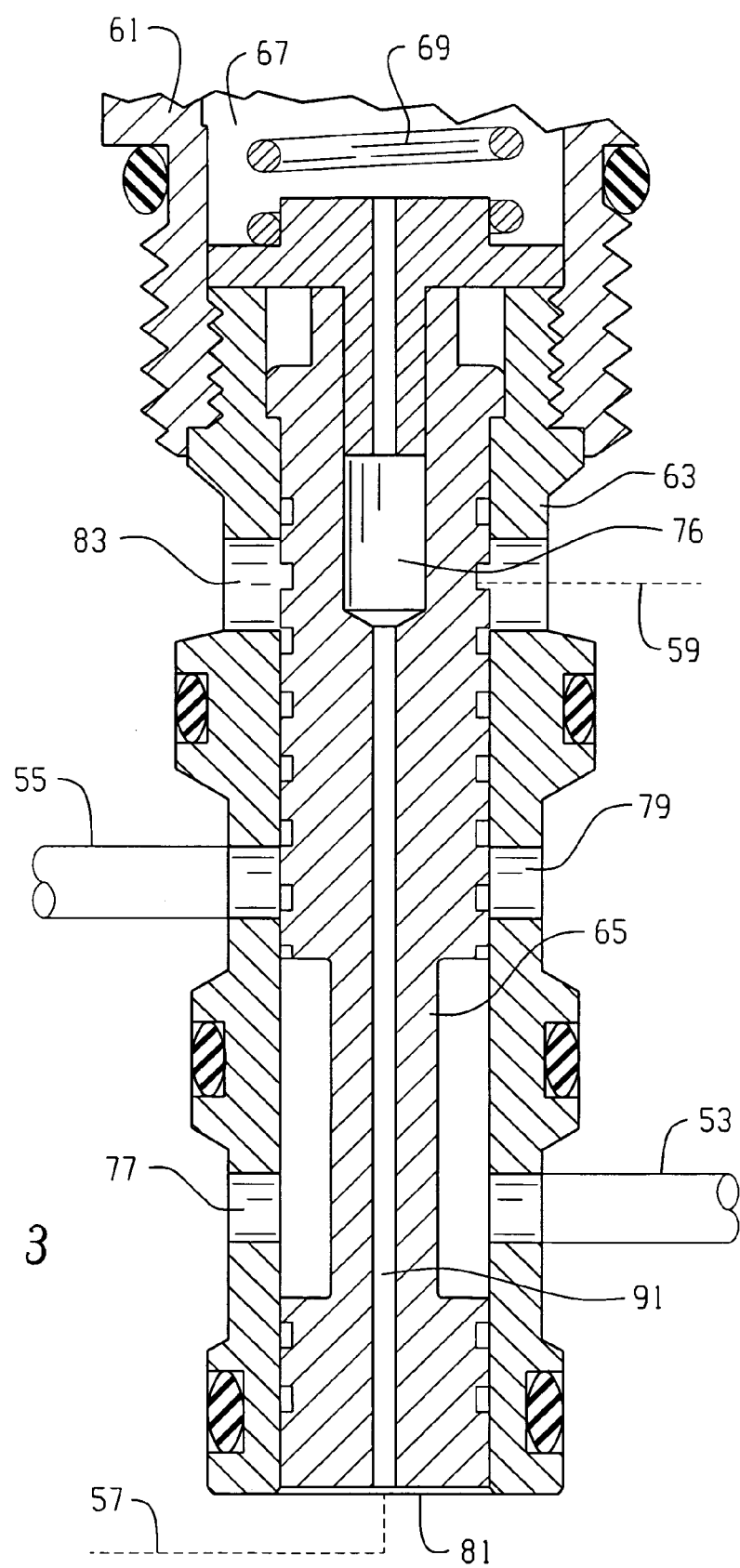
FIG. 3 is an enlarged, fragmentary, axial cross-section, similar to FIG. 2, but illustrating an alternative embodiment of the pressure spike suppression valve of the present invention.

Referring now to FIG. 3, there is illustrated an alternative embodiment of the hydraulic control system and pressure spike suppression valve 51 of FIGS. 1 and 2. In the embodiment represented in FIG. 3, all of the parts of the pressure spike suppression valve bear the same reference numerals as in the FIG. 2 embodiment because all of the parts may be substantially identical. The one difference is that the spool valve 65 defines an axially-extending signal passage 91, which communicates from the system pressure signal line 57 to the central opening 76. Therefore, in the embodiment of FIG. 3, there is a very small amount of fluid communicated from the system pressure signal line 57 through the signal passage 91, and into both the central opening 76 and the signal line 59. Those skilled in the load sensing art will recognize that this above-described small flow from the signal line 57 into the signal line 59 serves as a "dynamic" load signal, as opposed to the "static" type of load signal shown for the embodiment of FIGS. 1 and 2.

In connection with the use of the FIG. 3 embodiment of the valve 51, the only change required in the circuit in FIG. 1 will be the location of the check valve 18. In the circuit of FIG. 1, with a static load signal system, the check valve 18 is disposed downstream of the junction of the conduit 17 and the system pressure signal line 57. If the valve 51 of FIG. 2 is replaced by the dynamic load signal version of FIG. 3, the check valve 18 would be re-located to a position upstream of the junction of the conduit 17 and the signal line 57, for reasons believed to be apparent to those skilled in the art.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. A hydraulic control system including a source of pressurized fluid having a load pressure responsive means for varying the fluid delivery of said source; a fluid pressure operated actuator defining a pair of actuator ports; and a main control valve having an inlet in fluid communication with said source, and a pair of control ports in fluid communication with said actuator ports by means of first and second conduits; said main control valve defining a main variable flow control orifice which closes to prevent fluid flow through said main control valve when said main control valve is in a neutral condition, and including means operable to generate a load pressure representative of the hydraulic load on said actuator; and a pressure spike suppression valve having first and second ports connected to said first and second conduits, respectively, said pressure spike suppression valve including a valve member moveable between a first position blocking fluid communication between said first and second ports, and a second position permitting fluid communication between said first and second ports; characterized by:
   (a) said pressure spike suppression valve defining a spring chamber including a compression spring biasing said valve member toward said first position;
   (b) said pressure spike suppression valve defining a load signal passage to communicate said load pressure to a load signal chamber also to bias said valve member toward said first position; and (c) said pressure spike suppression valve defining a pressure chamber in fluid communication with said source of pressurized fluid, fluid pressure in said pressure chamber biasing said valve member toward said second position.

2. A hydraulic control system as claimed in claim 1, characterized by said fluid pressure operated actuator comprising a steering cylinder, and said main control valve comprising a steering control unit having said neutral condition, and being operable, in response to manual input in first and second directions, to communicate pressurized fluid to said first and second conduits, respectively.

3. A hydraulic control system as claimed in claim 1, characterized by said source of pressurized fluid comprising a pump and a load sensing priority flow control valve having its inlet in fluid communication with said pump and a controlled flow outlet port (CF) in fluid communication with said main control valve.

4. A hydraulic control system as claimed in claim 1, characterized by said pressure spike suppression valve comprising a main body adapted for threaded engagement with a threaded portion of other structure, whereby the pressure spike suppression valve comprises a cartridge valve.

5. A hydraulic control system as claimed in claim 4, characterized by said pressure spike suppression valve comprising a generally cylindrical sleeve valve, and said moveable valve member comprises a spool valve moveable within said sleeve valve between said first and said second positions.

\* \* \* \* \*